(12) United States Patent
Hamburg

(10) Patent No.: US 6,803,923 B1
(45) Date of Patent: Oct. 12, 2004

(54) DETERMINING COMPOSITION ORDER FROM LAYER EFFECTS

(75) Inventor: Mark Hamburg, Scotts Valley, CA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

(21) Appl. No.: 09/572,977

(22) Filed: May 16, 2000

(51) Int. Cl.$^7$ .............................. G09G 5/00; G06K 9/36
(52) U.S. Cl. ........................................ 345/629; 382/384
(58) Field of Search ................................ 345/629, 113; 348/584; 382/283–285, 294

(56) References Cited

U.S. PATENT DOCUMENTS

| | | | |
|---|---|---|---|
| 4,924,299 A | | 5/1990 | Mizuno et al. ............ 348/721 |
| 5,315,390 A | | 5/1994 | Windrem ................... 348/584 |
| 5,521,722 A | * | 5/1996 | Colvill et al. .............. 101/211 |
| 5,638,499 A | * | 6/1997 | O'Connor et al. ......... 345/419 |
| 5,874,967 A | | 2/1999 | West et al. ................. 345/629 |
| 5,880,740 A | * | 3/1999 | Halliday et al. ............ 345/629 |
| 5,892,521 A | | 4/1999 | Blossom et al. ............ 345/501 |
| 5,937,104 A | | 8/1999 | Henderson et al. ......... 382/279 |
| 6,028,583 A | | 2/2000 | Hamburg ................... 345/629 |
| 6,266,068 B1 | * | 7/2001 | Kang et al. ................ 345/422 |
| 6,377,269 B1 | * | 4/2002 | Kay et al. .................. 345/589 |

FOREIGN PATENT DOCUMENTS

EP  0 564 247 A1  10/1993

OTHER PUBLICATIONS

Adobe, Adobe After Effects User Guide, pp. 137–191, 323–342, Oct. 1995.

* cited by examiner

Primary Examiner—Matthew C. Bella
Assistant Examiner—Anthony Blackman
(74) Attorney, Agent, or Firm—Fish & Richardson P.C.

(57) ABSTRACT

A method of compositing a graphical image document having a plurality of layers in which a class is stored for each layer of the plurality of layers, a compositing sequence for the plurality of layers is derived from the classes, and the plurality of layers are composited in the compositing sequence.

45 Claims, 7 Drawing Sheets

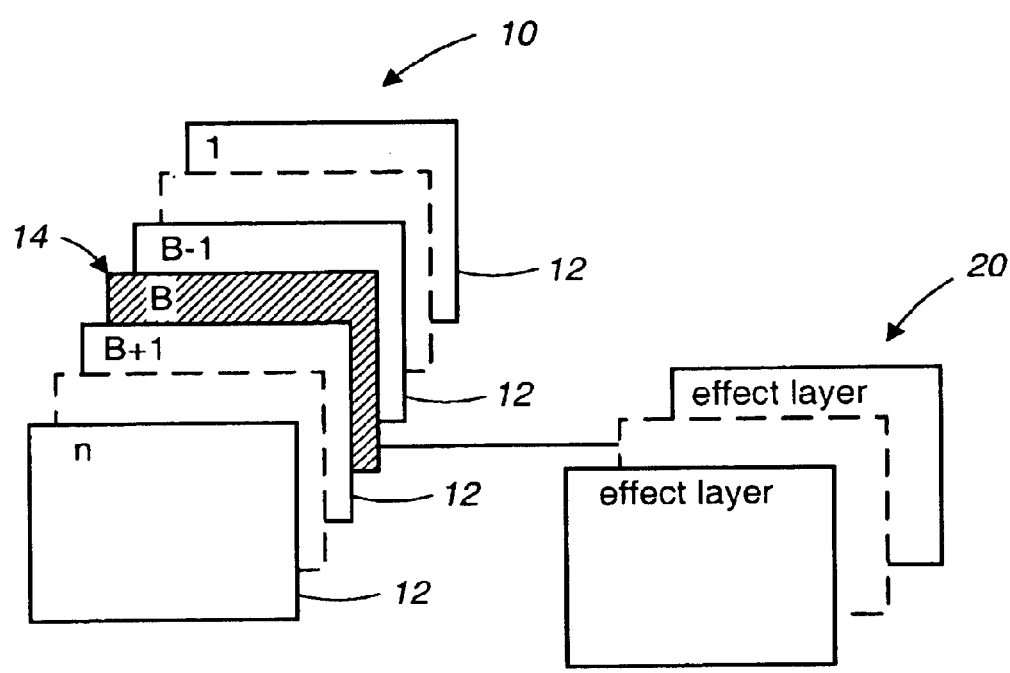
FIG._1

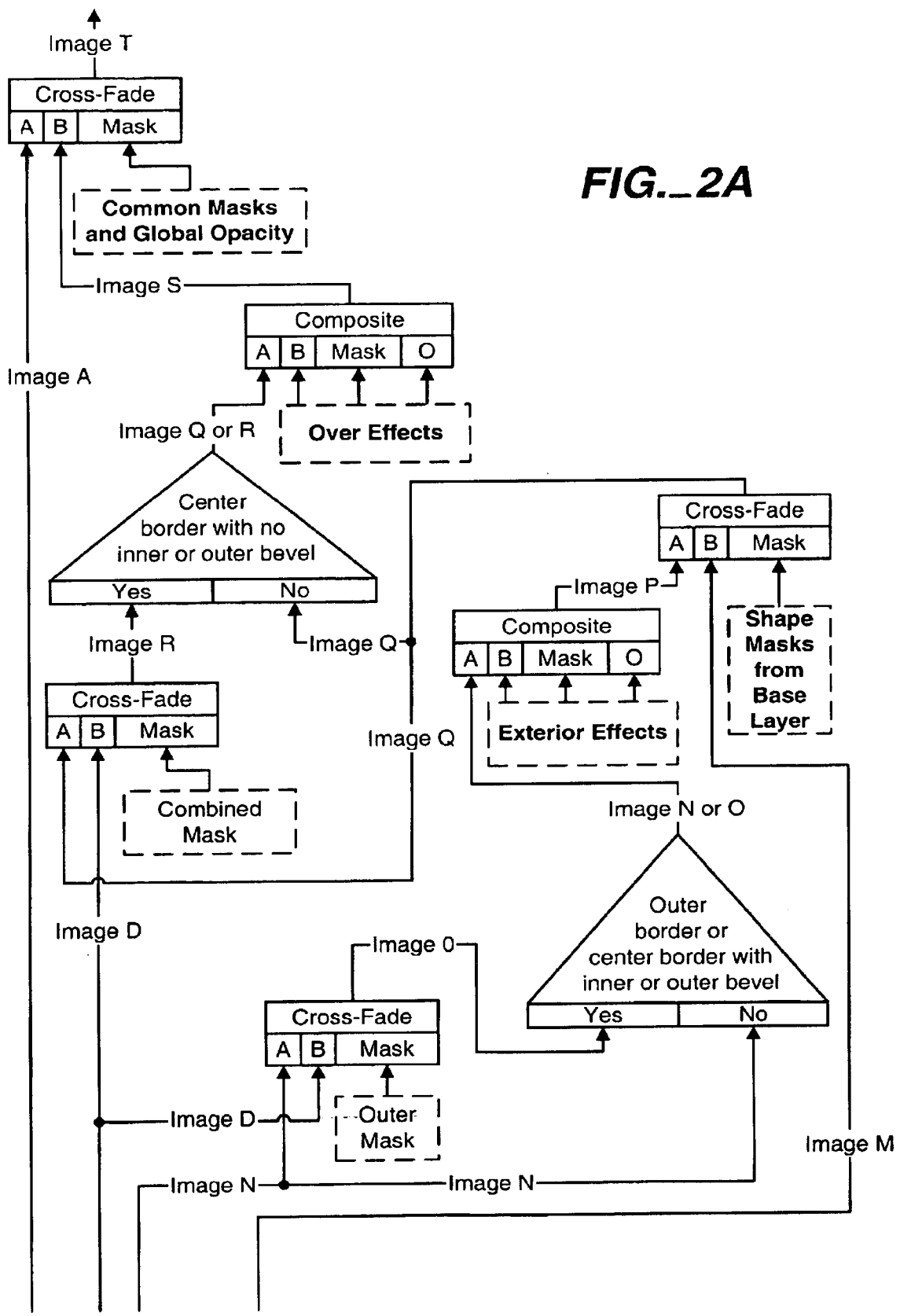
FIG._2A

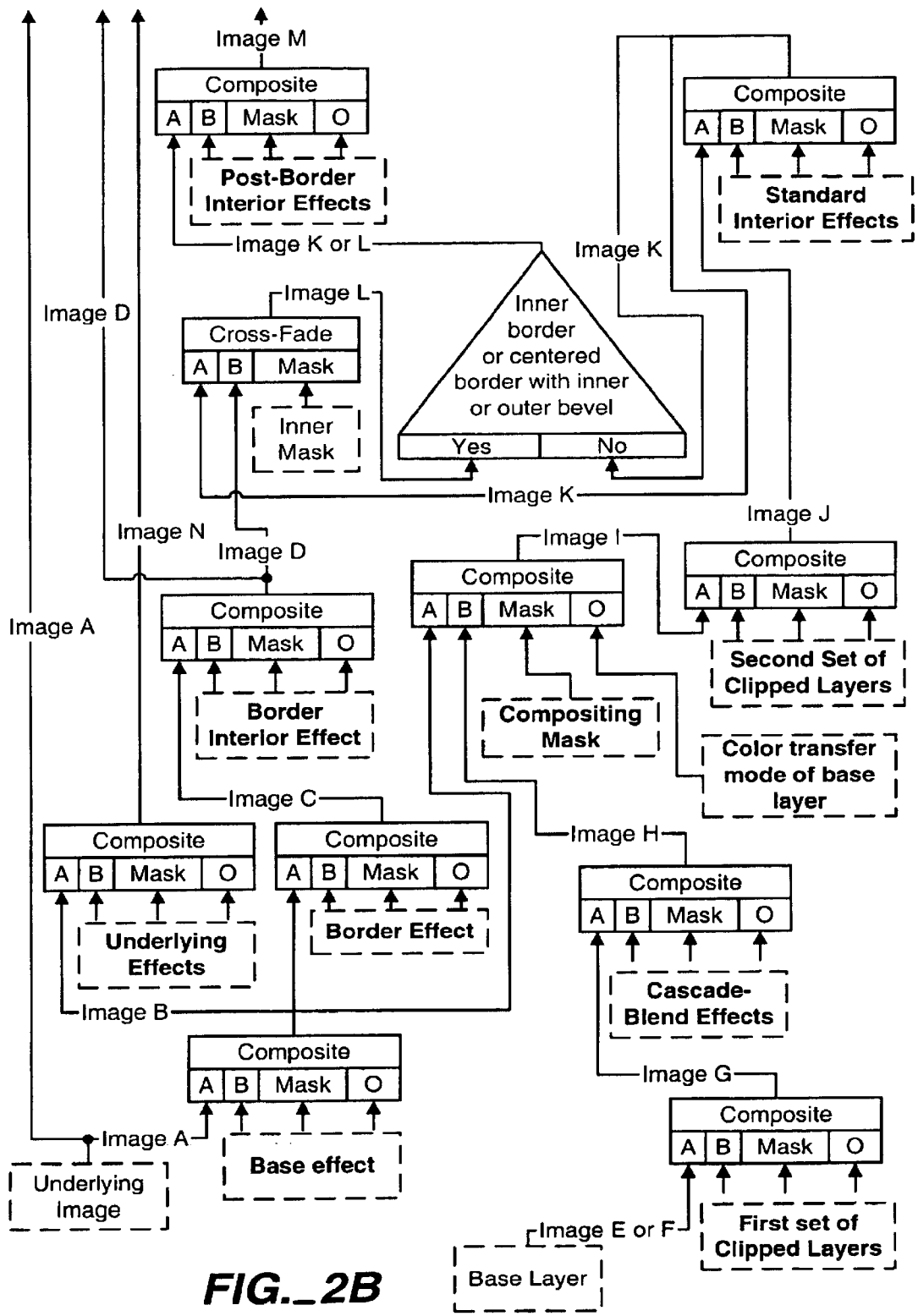
FIG._2B

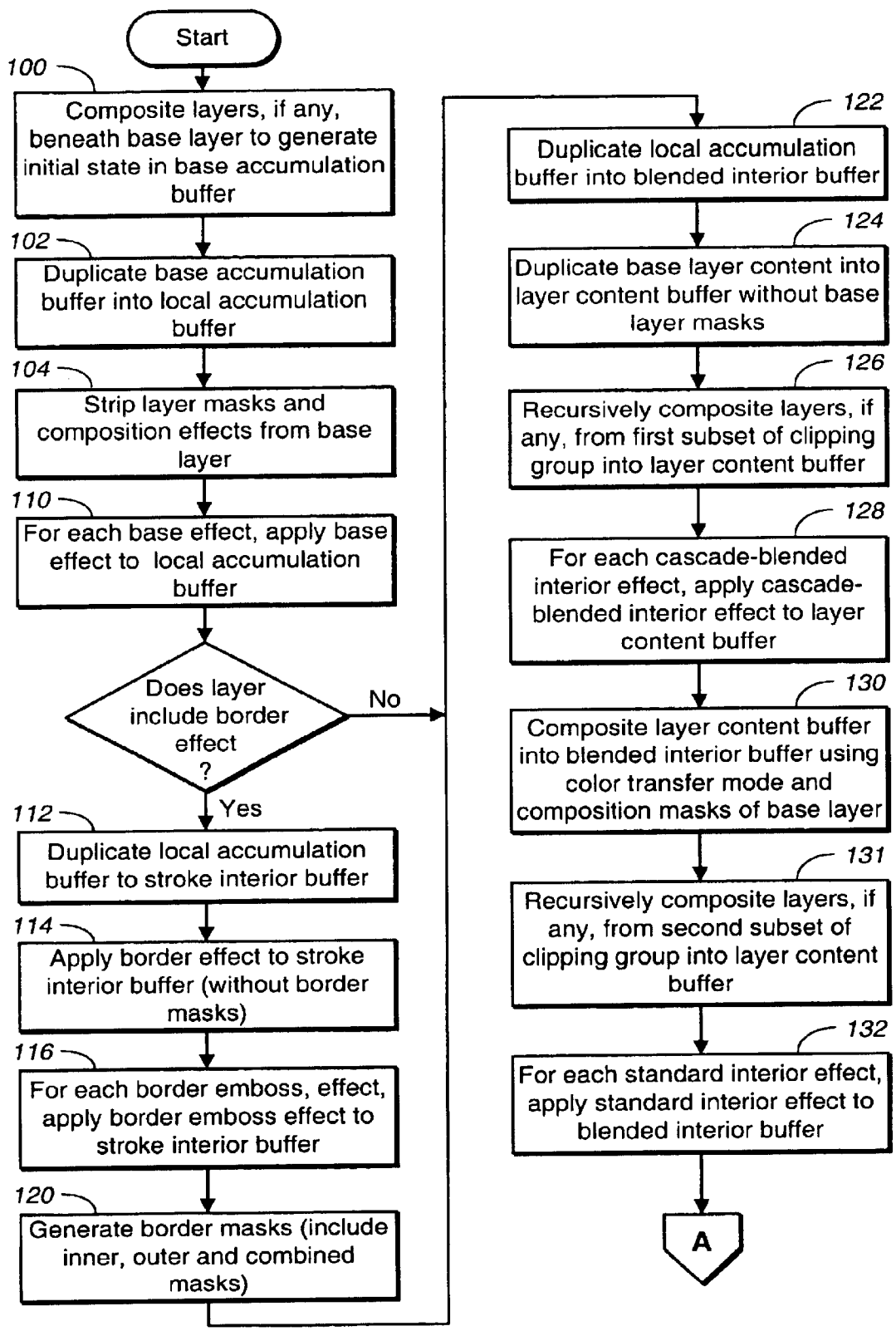
FIG._3A

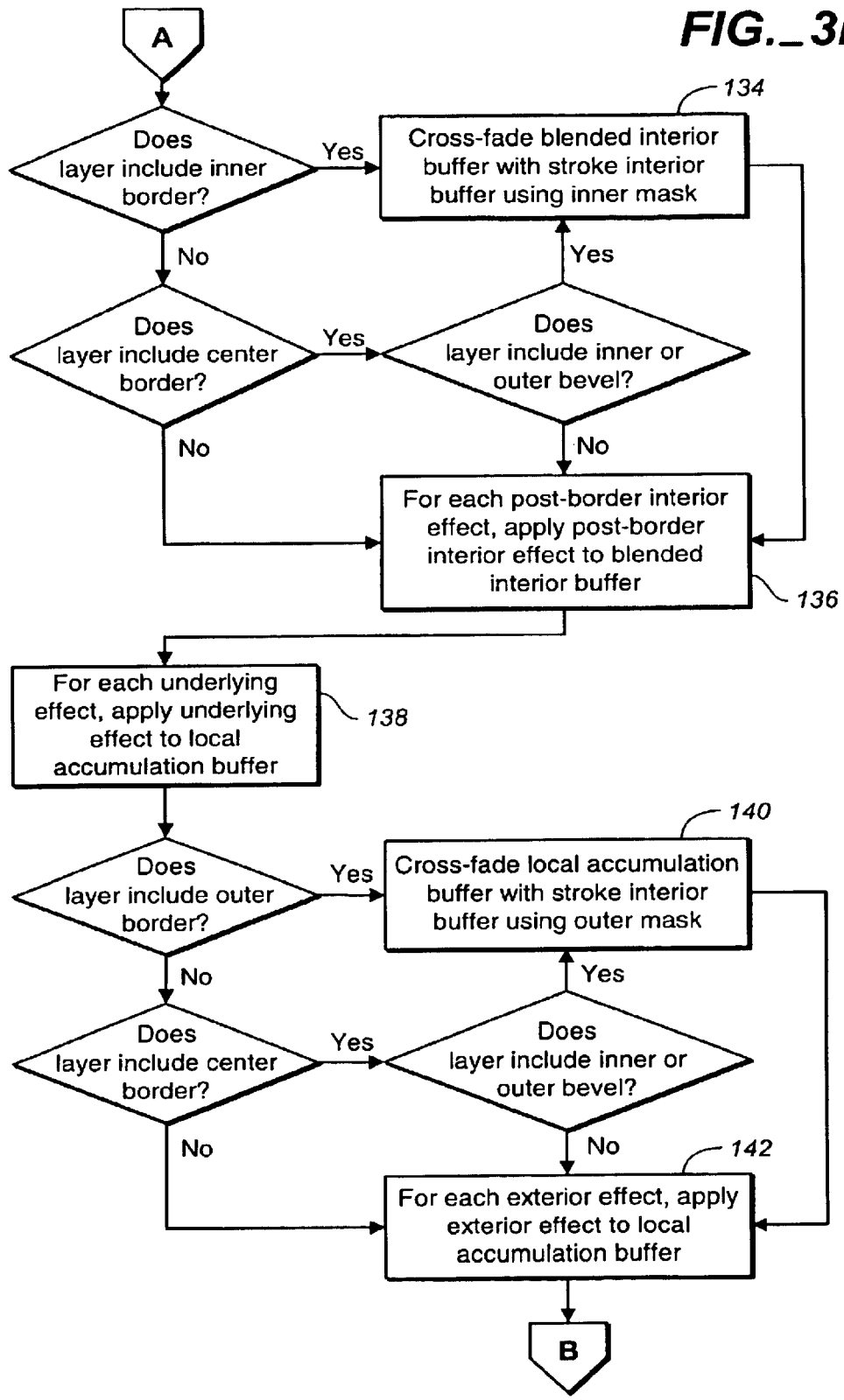
FIG._3B-1

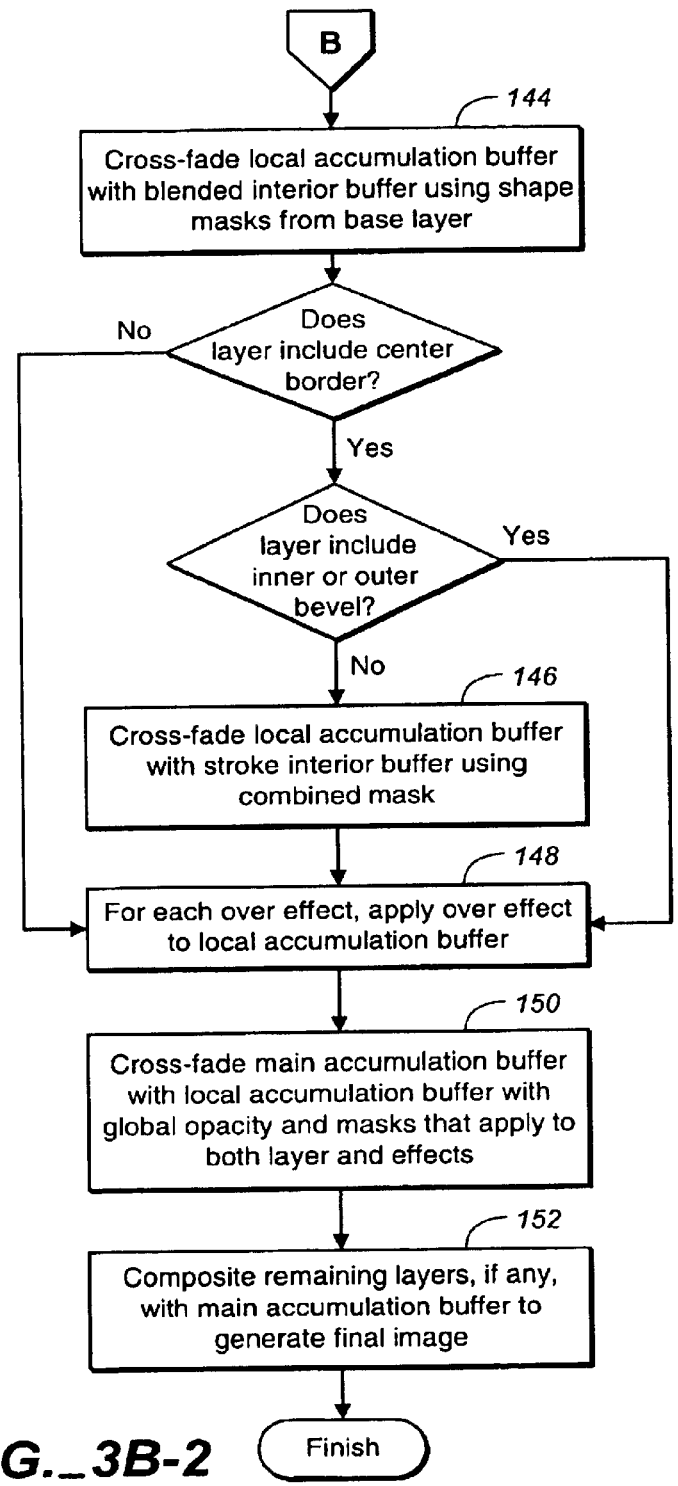
FIG._3B-1
FIG._3B-2
FIG._3B

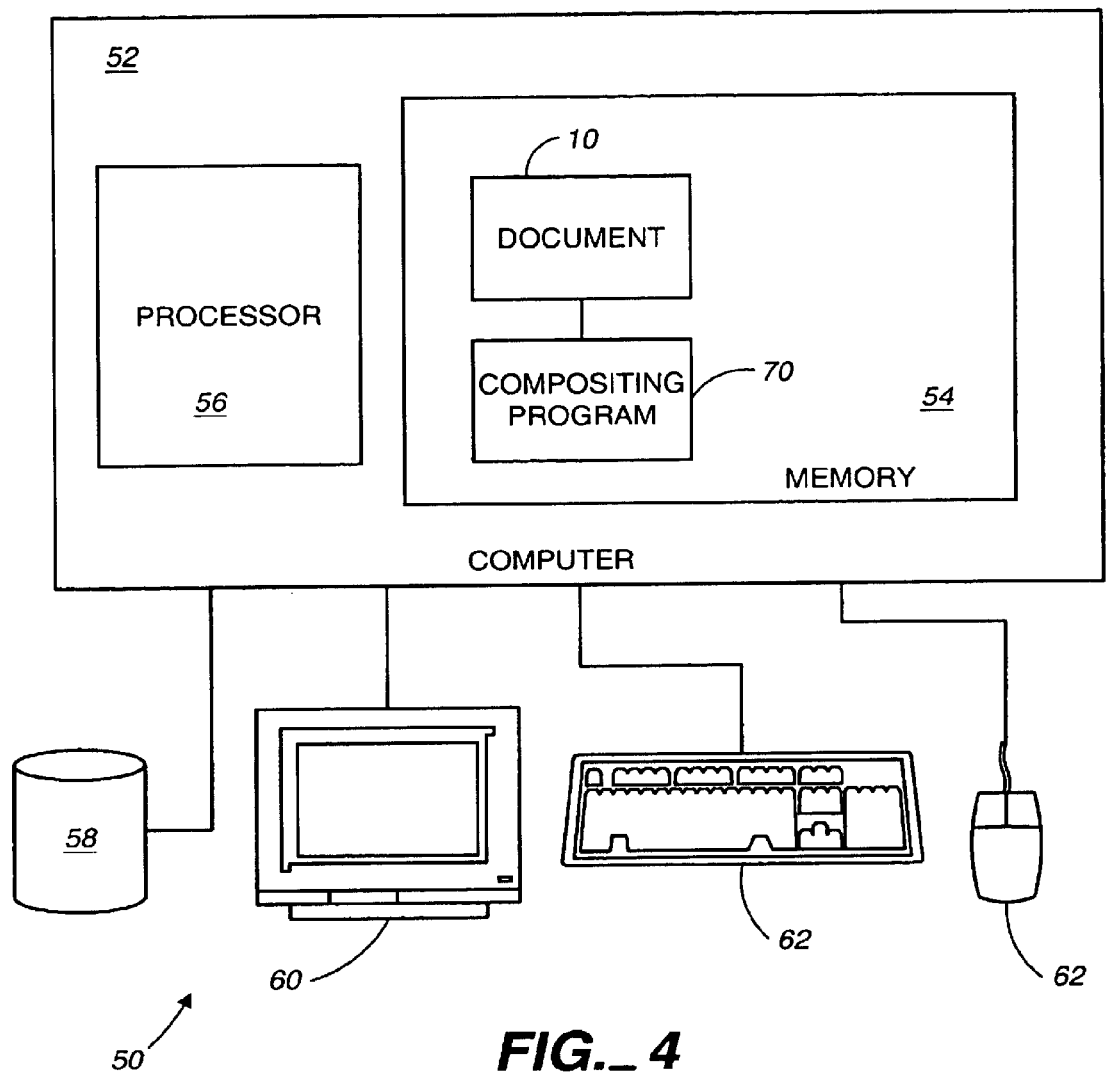
FIG._4

DETERMINING COMPOSITION ORDER FROM LAYER EFFECTS

BACKGROUND

The present invention is generally related to graphical image manipulation systems, and more particularly to methods for compositing multiple graphical images.

A graphical image manipulation computer program, such as Adobe Photoshop 5.0, from Adobe Systems Incorporated, of San Jose, Calif., may store a graphical image as a set of image layers. Such a program builds a final image by compositing the image layers together. The image layers may be thought of as stacked sheets of acetate. The density of the ink on the acetate controls the transparency of the sheet, i.e., the extent to which the sheet obscures the underlying sheets. In the computer program, the color and density of the ink on the acetate sheet are represented by a color value and an opacity (or "alpha") value, respectively.

A conventional graphical image document includes a set of image layers, commonly denoted as layers 1, 2, ..., n, organized in a layer stack. The bottom layer, i.e., layer 1, acts as the background or bottom sheet, whereas the other layers, i.e., layers 2, 3, ..., n, act as the transparencies which are overlaid on the background.

Each image layer typically includes an image, an optional mask or masks, and compositing controls. Typically, the image is represented by an array of pixels, with each pixel having a color and, optionally, an opacity. Similarly, the mask is typically represented by an array of pixels, with each pixel having an opacity. However, the image and the mask could be defined analytically, e.g., by using shape outlines, or by other functions which define color and/or opacity as a function of position. In addition, the image and the mask can be dynamic, i.e., the data representing the image is computed at the time the layers are composited from the data in an underlying image layer or layers. For example, one or more layers in the document could be filter layers, adjustment layers, or layer effects.

The compositing controls may include a global opacity and a transfer mode. The global opacity controls, in essence, the transparency of the entire image layer, whereas the transfer mode determines how the colors in the image layer mix with the colors accumulated from the underlying layers. The compositing controls may also be considered to include dynamic masks.

The process of stacking the acetate sheets to form the final image is modeled by an accumulation buffer which stores a composited color for each pixel. The image layers are composited in order from bottom to top. Conventionally, the compositing process begins by calculating any dynamic data in the image layer, such as the color of the pixels in the image or the opacity of the pixels in the mask. Then the opacity of each pixel is determined from the mask, the global opacity, and, if appropriate, the image. Finally, the color of each pixel in the image layer is combined with the composited color of the corresponding pixel in the accumulation buffer to generate a new composited color. The combination is controlled by the opacity of the layer pixel and the transfer mode. This process is iterated for each layer until all the layers have been composited, thus generating the final image.

Some graphics manipulation programs permit the user to generate a group of layers, e.g., a clipping group, that share properties with a base layer, or to create adjustment layers, filter layers or layer effects that are attached to a layer.

However, in both the conventional graphical image manipulation systems and the programs that permit layers to be clipped or attached to other layers, the order of composition of the layers is determined by their order in the stack. Unfortunately, there are some complex compositing effects for which it is difficult for a user to determine the proper order, attachment or grouping of the layers to achieve a desired visual appearance. In addition, there are some complex compositing effects that cannot be generated by merely combining image layers sequentially. An example of such a complex compositing effect is a layer that obscures its drop shadow but is partially opaque or has a non-normal blending mode. Another example is a layer that applies highlights and shadows to its interior using a normal blending mode but has a non-normal blending mode.

SUMMARY

In one aspect, the invention is directed to a method of compositing a graphical image document having a plurality of layers. In the method, a class is stored for each layer of the plurality of layers, a compositing sequence for the plurality of layers is derived from the classes, and the plurality of layers are composited in the compositing sequence.

Implementations of the invention may include one or more of the following features. The document may include a first layer, user input may be received selecting a layer effect for the first layer, and a second layer may be generated from the layer effect. The layer effect may be selected from drop shadow, inner shadow, outer glow, inner glow, outer bevel, inner bevel, emboss, border, and border emboss. An association between a plurality of layer effects and a plurality of default classes may be stored, and the class may be selected from the plurality of default classes based on the layer effect. User input selecting a class for the second layer may be received. A compositing hierarchy may be stored, and each class may be associated with a position in the compositing hierarchy.

In another aspect, the invention may be directed to a method of compositing a first image that overlies an underlying image. The first image includes a plurality of effects. A plurality of second images are generated from the first image, the underlying image, and the plurality of layer effects, and the first image, the underlying image, and the plurality of second images are composited in a composition sequence determined by the plurality of layer effects.

Implementations of the invention may include one or more of the following features. Any cascade blend effects, e.g., overlay or inner glow, may be applied to the first image to generate a first intermediate image. Any base effects, e.g., drop shadows, may be applied to the underlying image to generate a second intermediate image. The first intermediate image may be composited with the second intermediate image according to a color blending mode of the first image to generate a third intermediate image. Any standard interior effects, e.g., inner shadows or inner glows, and post-border interior effects, e.g., inner bevels, may be applied to the third intermediate image to generate a fourth intermediate image. Any underlying effects, e.g., outer glows or drop shadows, and any exterior effects, e.g., outer bevels, may be applied to the second intermediate image to generate a fifth intermediate image. The fifth intermediate image may be cross-faded with the fourth intermediate image to generate a sixth intermediate image. An over effects, e.g., an emboss, may be applied to the sixth intermediate image to generate a seventh intermediate image. The underlying image may be cross-faded with the seventh intermediate image to generate a resulting image. The composition sequence may include at least one conditional branch.

In another aspect, the invention is directed to a method of compositing a first image that overlies an underlying image. The first image including a border effect and at least one other effect. A first intermediate image is derived from the first image, the underlying image, and zero or more first layer effects. A second intermediate image is derived from the underlying layer and the border effect. A third intermediate image is derived from the underlying layer and zero or more second layer effects. If the border effect is an inner border or the border effect is a center border and the at least other effect includes an inner bevel or an outer bevel, the first intermediate image is cross-faded with the second intermediate image to generate a fourth intermediate image. If the layer effects include an inner bevel, a fifth intermediate image is derived from one of the fourth intermediate and first intermediate images and the inner bevel. If the border effect is an outer border or the border effect is a center border and the at least other effect includes an inner bevel or an outer bevel, the third intermediate image is cross-faded with the second intermediate image to generate a sixth intermediate image. If the layer effects include an outer bevel, a seventh intermediate image is derived from one of the sixth intermediate image and the third intermediate image. The seventh intermediate image is cross-faded with the fifth intermediate image to generate an eighth intermediate image. If the border effect is a center border and the at least other effect does not include an inner bevel or an outer bevel, the eighth intermediate image is cross-faded with the second intermediate image to generate a ninth intermediate image. Zero or more fourth layer effects are applied to the ninth intermediate image to generate a tenth intermediate image, and the underlying image is cross-faded with the tenth intermediate image to generate an eleventh image.

In another aspect, the invention is directed to a method of compositing a layer in a graphical image document, the layer including a layer image. User input selecting a global opacity for the layer and an effect for the layer is received. A first image is generated from the effect, the initial state of the document, the first image and the layer image are composited to generate a second image, and the initial state of the document is cross-faded with the second image using the global opacity to generate a sixth image.

Implementations of the invention may include one or more of the following features. User input selecting a common mask may be received, and the cross-fading step may use the common mask to generate the sixth image.

In another aspect, the invention is directed to a method of compositing a layer in a graphical image document. The layer including a first image and at least one layer effect. User input is received selecting a non-normal color blending mode for the layer. An initial state of the document below the layer is composited with the first image according to the non-normal color blending mode to generate a second image. A third image from is generated the layer effect, an initial state of the document below the layer is composited with the third image to generate a fourth image, and the fourth image is cross-faded with the second image to generate a fifth image.

In another aspect, the invention is directed to a method of compositing a layer in a graphical image document. The layer includes a layer image and a border effect. A first image is derived from an initial state of the document below the layer, and a second image is derived from the border effect.

The first image is composited with the second image to generate a third image, a fourth image is derived from the layer image, and the fourth image is cross-faded with the third image according to a border mask to generate a fifth image.

Possible advantages in implementations the invention may include one or more of the following. Complex compositing effects can be generated without requiring a complex user interface for the layering model. Layer opacity can be applied in a single step to the layer and the effects. A knockout of underlying effects can be performed even when the layer has a non-normal color blending mode or is partially opaque (a knockout is a compositing construct in which elements are blended against a background other than the current accumulation buffer and the result is cross-faded with the accumulation buffer through a shape mask). For example, a layer that obscures its drop shadow or other exterior effect can be generated even if the layer is partially opaque or uses a non-normal blending mode. Strokes can be generated that knockout the layer contents. Multi-modal clipping groups (a compositing construct in which elements are clipped to a base layer but in which color blending occurs separately) can be created. For example, bevel and emboss effects that are not contaminated by the color blending mode of the layer can be generated. A layer can be generated that applies highlights and shadows to its interior using a normal blending mode when the layer has a non-normal blending mode. Stroke, bevel and emboss effects can interact in a sophisticated fashion. Adjustment layers can be treated in a more formalized model.

Other features and advantages will become apparent from the following description, including the drawings and claims.

BRIEF DESCRIPTION OF THE DRAWINGS

FIG. 1 is a block diagram of a graphical image document containing layers, at least one of which has a plurality of layer effects and is associated with a plurality of virtual effect layers.

FIGS. 2A and 2B illustrate a composition order hierarchy in accordance with the present invention.

FIGS. 3A and 3B illustrate a method of compositing image layers from the graphical image document of FIG. 1 in accordance with the composition order hierarchy of FIGS. 2A and 2B.

FIG. 4 is a block diagram of a computer system that may be used to implement the invention.

DETAILED DESCRIPTION

In brief, in the computer graphics program of the present invention, each layer can have multiple layer effects. Adjustment layers and clipping grouped can also be attached to a layer. The program determines the order and type of compositing operations from the user's selection of effects for the layer based on a predefined hierarchy of effect relationships. Thus, depending on which effects have been selected, the program can perform different sequences of operations. This enables a user of the computer graphics program to create complex compositing effects without a complex user interface.

As shown in FIG. 1, a graphical image document 10 includes multiple image layers 12, denoted as layers 1, 2, . . . , n, organized in a layer stack. Each image layer can include an image, zero or more masks, a color blending effect (e.g., a transfer mode, such as Normal, Dissolve, Multiply, Screen, etc.), and a transparency treatment. The image provides color information, and optionally opacity information, as a function of position. Similarly, the optional mask or masks provide opacity information as a function of position. The image and the masks may be represented analytically or by pixels, and may include images, graphics, text, and the like. Each mask in the base layer can be classified as a shape mask (which will be applied to some of the layer effects), as a composition mask (which will be applied to some of the layer effects) or as a common mask (which will be applied to all of the layer effects). The color blending effect determines how the colors in the image layer blend with the colors of the composited underlying layers. The transparency treatment is to the opacity information as the transfer mode is to the color information, i.e., it determines a new opacity from the opacity of the individual image layer and the opacity of the composited underlying layers. The image can also include other compositing controls, such as a global opacity.

At least one of the image layers, e.g., image layer 14, referred to as a "base" layer for reference purposes, includes multiple layer effects, represented by virtual effect layers 20. The effect layers 20 are termed virtual because they need not be generated until the compositing operation has begun, although they can be generated earlier. The layer effects can be selected by the user of the graphics program with conventional simple dialog boxes. Exemplary layer effects include the following:

Drop Shadow—adds a shadow that falls behind the contents on the layer, giving the layer a raised appearance Inner Shadow—adds a shadow that falls just inside the edges of the layer contents, giving the layer a recessed appearance Outer Glow—adds a glow that emanates outwardly from the layer edge Inner Glow—adds a glow that emanates inwardly from the layer edge Outer Bevel—adds beveling along the outside of the layer edge Inner Bevel—adds beveling along the inside of the layer edge Emboss—creates the effect of embossing the layer contents against the underlying layers Pillow Emboss—creates the effect of stamping the edges of the layer (typically by creating outer and inner bevels in opposite directions)

Overlay—overlays a solid, patterned or gradient of color on the layer

Border—creates a boundary surrounding the layer or a selection from the layer. The boundary can be an inner border with an outer edge congruent with the edge of the image, an outer border with an inner edge congruent with the outer edge of the image, or a centered border that overlaps the edge of the image. However, rather than directly modifying the image (as is done by the "Stroke Command" in Adobe Photoshop 5.0), this border effect generates an effect layer with an image, one or more masks, and a color blending mode. Specifically, the inner and outer edges of the border can be determined with the procedures described in U.S. patent application Ser. No. 09/513,394, filed Feb. 25, 2000, the entire disclosure of which is incorporated by reference. Once the inner and outer edges are known, an image can be generated from a color and fill pattern selected by the user, and one or more masks can be also be generated from this edge information. The border use normal blending mode as a default.

Border Emboss—embosses the boundary, using the standard beveling techniques, but applied to the boundary Each of the effects (excepting the border and border emboss) can be generated by techniques available in Adobe Photoshop 5.5, and can be varied by the user based on parameters, such as depth, distance, lighting angle, color, and fill pattern, selected through the dialog boxes.

As noted, each layer effect (or component of the layer effect, if the effect includes multiple components, e.g., a bevel that both contains both highlighting and shadowing) is represented by a separate virtual effect layer. Each virtual effect layer can include an image (typically computed from the base layer 14 and previously applied effects), zero or more masks (again, typically computed from the base layer 14 and the image in the virtual effect layer), a global opacity, a color blending effect (typically selected by default based on the layer effect), and a compositing classification (again, typically selected by default based on the layer effect). Possible compositing classifications include base effects, under effects, over effects, exterior effects, standard interior effects, cascade-blended interior effects, post-border interior, border content effects, and border interior effects. A typical default correlation between the effects and the compositing classifications is shown by the following table:

| Compositing Classification | Effect |
| --- | --- |
| Base Effect | Drop Shadow |
| Under Effect | Outer Glow, Drop Shadow |
| Over Effect | Emboss |
| Exterior Effect | Outer Bevel, outer portion of Pillow Emboss |
| Standard Interior Effect | Inner Shadow, Inner Glow |
| Post-Border Interior Effect | Inner Bevel, inner portion of Pillow Emboss |
| Cascade-Blended Interior Effect | Overlay, Inner Glow |
| Border Content Effect | Border |
| Border Interior Effect | Border Emboss |

Although, the classification of the effect or component is typically set by default, in some implementations, the user can over-ride the default selection. For example, an Inner Glow could be classified as either a standard interior effect or as a cascade-blended interior effect based on the user selection. Other layer effects can also be classified into these compositing classifications.

The base layer 14 can be a conventional layer or an adjustment layer.

One or more additional layers can be clipped to the base layer 14 in a clipping group. The layers in the clipping group can be divided into two sets (either or both sets can be empty). The first set includes clipping layers which are affected by the color transfer mode of the base layer, whereas the second set includes clipping layers which are not affected by the color transfer mode of the base layer.

As discussed above, the program determines the order and type of compositing operations from the selected effects. As shown in FIG. 2, one hierarchy of effect relationships can be described as follows:

Image A=Initial state of document below base layer

Image B=Image A+Base effects

Image C=Image B+Border Content effect

Image D=Image C+Border Interior effects

Image E=Base layer contents

Image F=Image B+Adjustment layer (if base layer is an adjustment layer)

Image G=Image E or F+clipping group

Image H=Image G+Cascade blended interior effects

Image I=Image H composited with Image B using color transfer mode and composition masks (but not shaping or common masks) of base layer Image J=Image I+Second clipping group Image K=Image J+Standard interior effects Image L=Crossfade Image D into Image K (if inner border, or centered border with inner or outer bevel)

Image M=Image K or L+Post-border interior effects

Image N=Image B+Underlying effects

Image O=Crossfade Image D into Image N (if outer border, or centered border with inner or outer bevel)

Image P=Image N or O+Exterior effects

Image Q=Crossfade Image K into Image P using shape masks (but not composition or common masks) of base layer Image R=Crossfade Image D into Image Q (if centered border and no inner or outer bevel)

Image S=Image Q or R+Over effects

Image T=Crossfade Image S into Image A using global opacity and common masks (but not composition masks or shaping masks) of base layer The assignment of letters to these images is not intended to indicate a particular order or sequence, but to demonstrate their interrelationships. In addition, all of the operations need not be used. Where the base layer does not include a layer effect, the node for that effect is treated as a null operation and the image is not altered.

FIGS. 3A–3B schematically illustrate a method of compositing the document 10 containing the layers 12 and the virtual effect layers 20 to carry out the composition hierarch shown in FIG. 2. The method utilizes several accumulation buffers, including a main accumulation buffer, a local accumulation buffer, a stroke interior accumulation buffer, a blended interior accumulation buffer, and a layer content accumulation buffer. Not all of these accumulation buffers need be used, depending on the layer effects selected by the user.

Initially, the computer graphics program determines an initial state of the document below the base layer 14, and stores the initial state in the base accumulation buffer (step 100). The base accumulation buffer may include opacity information. For example, the image layers underlying the base layer 14, i.e., layers 1, 2, . . . , B−1, can be composited (e.g., blended) normally using the main accumulation buffer to generate a first intermediate image (image A). Compositing can cover a variety of operations, including accumulation or blending, cross-fading, and erasing. If there are no image layers beneath the base layer 14, the base accumulation buffer can be set to the initial state of an image used by the graphics program using a default color (e.g., white or black) and default transparency (e.g., transparent or opaque).

Once the initial state of the document below the base layer 14 has been determined, the contents of the main accumulation buffer (image A) are copied into the local accumulation buffer (step 102). In addition, the shape and composition effects are stripped from the base layer 14 and stored (step 104). The color components of the image in the base layer 14 will be composited later in the process.

If the base layer includes base effects, each base effect is applied to the local accumulation buffer (step 110). A base effect is an effect, e.g., a drop shadow that does not get obscured, that is intended to be visible through the layer even if the layer is partially opaque or uses a non-normal color transfer mode. To apply the base effects, each image in a virtual layer associated with a base effect is composited with the image in the local accumulation buffer (image A) to generate a second intermediate image (image B). The second intermediate image is stored in the local accumulation buffer. This composition step is performed according to the mask and color transfer mode of the base effect virtual layer(s).

If the layer includes a border content effect (inner, outer or center), the graphics program duplicates the local accumulation buffer (image B) into the stroke interior buffer (step 112), and applies the border content effect to the stroke interior buffer (step 114). To apply the border effects, the image in the virtual layer associated with the border contents (e.g., the color and pattern of the border) is composited with the image in the stroke interior buffer (image B) to generate a third intermediate image (image C). The third intermediate image is stored in the stroke interior buffer. This composition step is conducted using the color transfer mode, but not the border masks, of the virtual layer for the border effect.

In addition, if the layer includes any border interior effects, such as an embossed border effect, the border interior effects are applied to the stroke interior buffer (step 116). To apply the border interior effects, the image in each of the virtual layers associated with the border interior effects is composited with the image in the stroke interior buffer (image C) to generate a fourth intermediate image (image D). The fourth intermediate image is stored in the stroke interior buffer. This composition step uses the color transfer mode and masks of the virtual layer(s).

Once the border and border interior effects have been applied, the masks for the border are created (step 120). The outer border mask (used by outer and centered borders) represents the outer edge of the border, the inner border mask (used by inner and centered borders) represents the inner edge of the border, and the combined border mask (used by centered borders) represents the area actually covered by the border. For an inner border, the inner border mask is calculated. For an outer border, the outer border mask is calculated. For a centered border in a layer that does has no embossing/beveling, or has a centered emboss or a border emboss, only the combined mask is calculated. For a centered border in a layer that has an inner bevel or an outer bevel effect, both the inner mask and outer border masks are calculated. Any masks that are not calculated can be left undefined.

Once the border masks have been generated, or if the layer does not include a border effect, the local accumulation buffer (image B) is duplicated into the blended interior buffer (step 122).

Next, assuming the base layer is a normal layer, the image contents from the base layer 14 (image E) are copied into the layer content buffer (step 124). However, the shape or layer masks from the base layer 14 are not copied.

Alternatively, if the base layer is an adjustment layer, the contents of the local accumulation buffer are copied to the layer content buffer (step 124b), and the adjustment is applied to the layer content buffer (step 124b) to generate new color data in the layer contents buffer (image F). Again, the shape or layer masks from the base adjustment layer 14 are not copied. Thus, the alpha value is set to fully opaque throughout the layer content buffer. When the adjusted data is eventually blended into the blended interior buffer, the alpha information in the blended interior buffer is preserved.

If the base layer is part of a clipping group, each layer from the first subset of layers in the clipping group is composited with the modified base image (image E or F) in the layer content buffer (step 126) to generate a fifth intermediate image (image G). The fifth intermediate image is stored in the layer content buffer. The order in which the clipping group layers are composited is determined by their position in the clipping group stack, i.e., bottom layer first. Each compositing step uses the color transfer mode and mask of the clipped layer. It should be noted that the clipped layers can have their own effects, in which case the compositing process for the clipped layer is performed recursively until a final version of the clipped layer has been generated.

If the layer includes any cascade-blended interior effects, each cascade-blended interior effect is applied to the layer content buffer (step 128). The cascade-blended interior effects are effects that are blended before the blending that uses the color transfer mode of the base layer. Examples of cascade-blended interior effects include the overlay and satin effects. To apply the cascade-blended interior effects, each image in a virtual layer associated with a cascade-blended interior effect is composited with the image in the layer content buffer (image G) to generate a sixth intermediate image (image H). The sixth intermediate image is stored in the layer content buffer. This composition step uses the color transfer mode and masks of the virtual layer(s).

Once any clipping groups have been composited and any cascade-blended interior effects have been applied, the image in the layer content buffer (image H) is composited with the image in the blended interior buffer (image B) using the color transfer mode (and possibly other compositing controls) from the base layer 14 (step 130) to generate a seventh intermediate image (image I). Although this compositing step uses the color transfer mode and compositing masks of the base layer 14, it need not use one or more of the masks from the base layer 14. Specifically, the compositing step does not use the shape or common masks. The resulting seventh intermediate image is stored in the blended interior buffer.

If the base layer is part of a clipping group, the blended interior buffer (image I) is go composited with each clipping layer from the second subset (step 131) to generate an eighth intermediate image (image J). The eighth intermediate image is stored in the layer content buffer. The order in which the clipping group layers are composited is determined by their position in the second subset of the clipping group stack, i.e., bottom layer first. Each compositing step uses the color transfer mode and mask of the clipped layer.

If the layer includes any standard interior effects, each standard interior effect is applied to the blended interior buffer (step 132). Standard interior effects are effects that are blended after the blending with the color transfer mode of the base layer. An example of a standard interior effect is the inner shadow effect. To apply the standard interior effects, each image in a virtual layer associated with a standard interior effect is composited with image in the blended interior buffer (image J) to generate a ninth intermediate image (image K). The ninth intermediate image is stored in the blended interior buffer. This composition step uses the color transfer mode and masks of the virtual layer(s).

Continuing in FIG. 2B, if the layer includes an inner border, or if the layer includes a centered border and any post-border interior or exterior effects (e.g., an inner or outer bevel), then the blended interior buffer (image K) is cross-faded with the stroke interior buffer (image D) under control of the inner mask (step 134) to generate a tenth intermediate image (image L). The resulting image is stored in the blended interior buffer. The cross-fade (discussed in U.S. patent application Ser. No. 09/306,374, filed May 6, 1999, the entire disclosure of which is incorporated herein by reference) calculates a resulting graphic element <R,r> having color value R and alpha value r in accordance with $$<R,r>=X\text{Fade}(<X,x>,<Y,y>,z)$$

$$r=\text{InterpolateAlpha}(x, y, z),$$

$$R=\text{InterpolateColor}(X, Y, t), \text{ and}$$

$$t=y \cdot z/r,$$

where InterpolateAlpha can be a linear interpolation function yielding $r=x \cdot (1-z)+y \cdot z$, and InterpolateColor can be a linear interpolation function yielding $R=X \cdot (1-t)+Y \cdot t$.

If the layer includes any post-border interior effects, each post-border interior effect is applied to the blended interior buffer (step 136). An example of a post-border interior effect is an inner bevel. To apply the post-border interior effects, each image in a virtual layer associated with a post-border interior effect is composited with the image in the blended interior buffer (image K or L) to generate an eleventh intermediate image (image M). The eleventh intermediate image is stored in the blended interior buffer. This composition step uses the color transfer mode and masks of the virtual layer.

If the layer includes any underlying effects, each underlying effect is applied to the local accumulation buffer (step 138). The underlying effects are effects that are always obscured by the layer regardless of the color transfer mode of the base layer. An example of an underlying effect is an outer glow. A drop shadow can also be an underlying effect. To apply the underlying effects, each image in a virtual layer associated with a underlying effect is composited with the image in the local accumulation buffer (image B) to generate a twelfth intermediate image (image N). The twelfth intermediate image (image N) is stored in the local accumulation buffer. This composition step uses the color transfer mode and masks of the virtual layer(s).

If the layer includes an outer border, or if the layer includes a centered border and any post-border interior or exterior effects (e.g., an inner or outer bevel), then the local accumulation buffer (image N) is cross-faded with the stroke interior buffer (image D) under control of the outer mask (step 140) to generate a thirteenth intermediate image (image O). The thirteenth intermediate image is stored in the local accumulation buffer.

If the layer includes any exterior effects, each exterior effect is applied to the local accumulation buffer (step 142). The exterior effects are effects that are applied after the border. An example of an exterior effect is an outer bevel. To apply the exterior effects, each image in a virtual layer associated with an exterior effect is composited with the image in the local accumulation buffer (image N or O) to generate a fourteenth intermediate image (image P). The fourteenth intermediate image is stored in the local accumulation buffer. This compositing step uses the color transfer mode and masks of the virtual layer(s).

Once the exterior effects have been applied, the local accumulation buffer (image P) is cross-faded with the blended interior buffer (image K) under control of the shape mask or masks from the base layer (step 144) to generate a resulting fifteenth intermediate image (image Q). The fifteenth intermediate image is stored in the local accumulation buffer.

Then, if the layer includes a center border but no post-border interior or exterior effects (e.g., inner or outer bevels), the local accumulation buffer (image Q) is cross-faded with the stroke interior buffer (image D) under control of the combined mask (step 146) to generate a sixteenth intermediate image (image R). The sixteenth intermediate image is stored in the local accumulation buffer.

If the layer includes any over effects, each over effect is applied to the local accumulation buffer (step 148). The over effects are effects that exist over the whole layer. An examples of an exterior effect is an emboss or centered bevel. To apply the over effects, each image in a virtual layer associated with an over effect is composited with the image in the local accumulation buffer (image Q or R) to generate a seventeenth intermediate image (image S). The seventeenth intermediate image is stored in the local accumulation buffer. This compositing step uses the color transfer mode and masks of the virtual layer(s).

Once the over effects have been applied, the original accumulation buffer (image A) is cross-faded with the local accumulation buffer (image S) under control of the global opacity of the base layer and any common masks (step 150) to generate an eighteenth intermediate image (image T). The eighteenth intermediate image is stored in the original accumulation buffer.

Once the original accumulation buffer has been cross-faded with the local accumulation buffer, each layer of the document 10 above the base layer 14, i.e., layers B+1, B+2, ..., n, is composited (e.g., blended) with the image in the original accumulation buffer (image T) to generate a final image (image U). If there are no other layers above the base layer, the compositing process stops, and the seventeenth intermediate image (image T) becomes the final image.

The above description has treated each effect as generating a single virtual layer. However, some effects may be "multi-mode effects", i.e., effects with multiple components that generate multiple virtual layers. For example, a bevel that contains both highlighting and shadowing can generate one virtual layer for the highlighting effect and one virtual layer for the shadow effect. The virtual layers generated by a multi-mode effect can have the same composition classification (e.g., an inner bevel in which both the highlighting and shadowing layer receive the post-border interior effect class) or can have different classifications (e.g., a pillow emboss in which the inner portion receives the post-border interior class and the outer portion receives the exterior effect class). Thus, the virtual layers created by a single effect can be applied within the same step in the composition process, or at different steps in the composition process. This permits complex effects to be created with the proper composition order with a simple user interface.

Referring to FIG. 4, the method of the present invention may be implemented with a memory 54, such as conventional random access memory, and a processor 56, such as a conventional microprocessor. The memory and processor may be components of a general-purpose computer 52 of conventional construction in a computer system 50. The computer system 50 may also include a mass storage device 58, an output device 60, such as a display screen, laser printer print engine, photo typesetter, or laser film recorder, and an input-device 62, such as a keyboard or mouse. The microprocessor 56 is controlled by a graphical image manipulation program 70 stored in memory 54. The graphical image manipulation program 70 has access to the document 10. Alternately, the processor and memory may be embedded in a peripheral device. Although illustrated as a single computer, the computer system and graphical image manipulation program can be distributed across multiple computers in a network.

The methods described may be implemented in hardware, firmware, software, or combinations thereof, or in a computer program product tangibly embodied in a computer readable storage device. Storage devices suitable for tangibly embodying the computer program include all forms of non-volatile memory, including semiconductor memory devices, magnetic disks, magneto-optical disks, and optical disks.

A specific implementation of the invention has been described. Nevertheless, it will be understood that various modifications may be made without departing from the spirit and scope of the invention. Different buffers can be used to store the images, and the order of various steps or sets of steps can be changed. For example, once the local accumulation buffer has been copied to the blended interior buffer, the under effects could be applied immediately. In addition, various steps could be performed in parallel. In general, any order of steps is satisfactory, so long as it accomplishes the composition order hierarchy shown in FIGS. 2A and 2B. The overall order could be described as build the base, build the border, build the blended interior, and then put the pieces together. Accordingly, other embodiments are within the scope of the following claims.

What is claimed is:

1. A method of compositing a graphical image document having a plurality of layers, comprising:

matching a class to each layer of the plurality of layers, wherein the class for each layer is associated with an effect and has a priority, the matching is achieved by determining the effect that generated each layer, and the document includes a plurality of classes;

for each layer of the plurality of layers, storing the class that has been matched to the layer:

using the class matched to each layer to derive a compositing sequence for the plurality of layers based on the priority of each class; and compositing the plurality of layers in the compositing sequence using the priority of each class to order the plurality of layers.

2. The method of claim 1, wherein the document includes a first layer, and further comprising receiving user input selecting a layer effect for the first layer, and generating a second layer from the layer effect.

3. A method of compositing a graphical image document having a plurality of layers, comprising:

receiving user input selecting a layer effect for a first layer of the document, wherein the layer effect is selected from drop shadow, inner shadow, outer glow, inner glow, outer bevel, inner bevel, emboss, border, and border emboss, and generating a second layer from the layer effect;

matching a class to each layer of the plurality of layers, wherein the class for each layer is associated with an effect and has a priority, the matching is achieved by determining the effect that generated each layer, and the document includes a plurality of classes;

for each layer of the plurality of layers, storing the class that has been matched to the layer;

using the class matched to each layer to derive a compositing sequence for the plurality of layers based on the priority of each class; and compositing the plurality of layers in the compositing sequence using the priority of each class to order the plurality of layers.

4. The method of claim 2, further comprising storing an association between a plurality of layer effects and a plurality of default classes, and selecting the class from the plurality of default classes based on the layer effect.

5. The method of claim 2, further comprising receiving user input selecting a class for the second layer.

6. The method of claim 1, wherein deriving a compositing sequence includes storing a compositing hierarchy, and each class is associated with a position in the compositing hierarchy.

7. A method of compositing a first image that overlies an underlying image, the first image including a plurality of layer effects, comprising:
generating a plurality of second images from the first image, the underlying image, and the plurality of layer effects, wherein each layer effect is a type of effect and a priority is assigned to each of the types of effects;
selecting a composition sequence for ordering the second images, wherein the composition sequence is based on the priority assigned to the types of effects; and
compositing the first image, the underlying image, and the plurality of second images in an order determined by the composition sequence.

8. The method of claim 7, wherein the compositing step includes applying any cascade blend effects to the first image to generate a first intermediate image.

9. The method of claim 8, wherein the cascade blend effects are selected from overlay and inner glow.

10. The method of claim 8, wherein the compositing step includes applying any base effects to the underlying image to generate a second intermediate image.

11. The method of claim 10, wherein the base effects are selected from drop shadow.

12. The method of claim 10, wherein the compositing step includes compositing the first intermediate image with the second intermediate image according to a color blending mode of the first image to generate a third intermediate image.

13. The method of claim 12, wherein the compositing step includes applying any standard interior effects and post-border interior effects to the third intermediate image to generate a fourth intermediate image.

14. The method of claim 13, wherein the standard interior effects are selected from inner shadow and inner glow.

15. The method of claim 13, wherein the post-border interior effects are selected from inner bevel.

16. The method of claim 13, wherein the compositing step includes applying any underlying effects and exterior effects to the second intermediate image to generate a fifth intermediate image.

17. The method of claim 16, wherein the underlying effects are selected from outer glow and drop shadow.

18. The method of claim 16, wherein the exterior effects are selected from outer bevel.

19. The method of claim 16, wherein the compositing step includes cross-fading the fifth intermediate image with the fourth intermediate image to generate a sixth intermediate image.

20. The method of claim 19, wherein the compositing step includes applying an over effects to the sixth intermediate image to generate a seventh intermediate image.

21. The method of claim 20, wherein the over effects are selected from emboss.

22. The method of claim 20, wherein the compositing step includes cross-fading the underlying image with the seventh intermediate image to generate a resulting image.

23. The method of claim 7, wherein the compositing step includes at least one conditional branch.

24. A method of compositing a first image that overlies an underlying image, the first image including a border effect and at least one other effect, comprising:
deriving a first intermediate image from the first image, the underlying image, and zero or more first layer effects;
deriving a second intermediate image from the underlying layer and the border effect;
deriving a third intermediate image from the underlying layer and zero or more second layer effects;
if the border effect is an inner border or the border effect is a center border and the at least other effect includes an inner bevel or an outer bevel, cross-fading the first intermediate image with the second intermediate image to generate a fourth intermediate image;
if layer effects include an inner bevel, deriving a fifth intermediate image from one of the fourth intermediate and first intermediate images and the inner bevel;
if the border effect is an outer border or the border effect is a center border and the at least other effect includes an inner bevel or an outer bevel, cross-fading the third intermediate image with the second intermediate image to generate a sixth intermediate image;
if the layer effects include an outer bevel, deriving a seventh intermediate image from one of the sixth intermediate image and the third intermediate image;
cross-fading the seventh intermediate image with the fifth intermediate image to generate an eighth intermediate image;
if the border effect is a center border and the at least other effect does not include an inner bevel or an outer bevel, cross-fading the eighth intermediate image with the second intermediate image to generate a ninth intermediate image;
applying zero or more fourth layer effects to the ninth intermediate image to generate a tenth intermediate image; and
cross-fading the underlying image with the tenth intermediate image to generate an eleventh image.

25. A method of compositing a layer in a graphical image document, the layer including a layer image, comprising:
receiving user input selecting a global opacity for the layer;
receiving user input selecting an effect for the layer;
generating a first image from the effect;
compositing an initial state of the document, the first image and the layer image to generate a second image; and
cross-fading the initial state of the document with the second image using the global opacity to generate a third image.

26. The method of claim 25, further comprising receiving user input selecting a common mask, and the cross-fading step uses the common mask to generate the third image.

27. A method of compositing a layer in a graphical image document, the layer including a first image and at least one layer effect, comprising:
receiving user input selecting a non-normal color blending mode for the layer;
compositing an initial state of the document below the layer with the first image according to the non-normal color blending mode to generate a second image;
generating a third image from the layer effect;
compositing an initial state of the document below the layer with the third image to generate a fourth image; and
cross-fading the fourth image with the second image to generate a fifth image.

28. A method of compositing a layer in a graphical image document, the layer including a layer image, a border effect, and a border mask, comprising:
deriving a first image from an initial state of the document below the layer;
generating a second image from the border effect;
compositing the first image with the second image to generate a third image;
deriving a fourth image from the layer image; and
cross-fading the fourth image with the third image according to the border mask to generate a fifth image.

29. A computer program product embodied on an information carrier for compositing a first image that overlies an underlying image, the first image including a plurality of layer effects, the product comprising instructions operable to cause a computer system to perform operations comprising:
generating a plurality of second images from the first image, the underlying image, and the plurality of layer effects, wherein each layer effect is a type of effect and a priority is assigned to each of the types of effects;
selecting a composition sequence for ordering the second images, wherein the composition sequence is based on the priority assigned to the types of effects; and
compositing the first image, the underlying image, and the plurality of second images in an order determined by the composition sequence.

30. The computer program product of claim 29, wherein the instructions operable to cause a computer system to composite include instructions operable to cause a computer system to apply any cascade blend effets to the first image to generate a first intermediate image.

31. The computer program product of claim 30, wherein the cascade blend effects are selected from overlay and inner glow.

32. The computer program product of claim 30, wherein the instructions operable to cause a computer system to composite include instructions operable to cause a computer system to apply any base effects to the underlying image to generate a second intermediate image.

33. The computer program product of claim 33, wherein the base effects are selected from drop shadow.

34. The computer program product of claim 33, wherein the instructions operable to cause a computer system to composite include instructions operable to cause a computer sytem to composite the first intermediate image with the second intermediate image according to a color blending mode of the first image to generate a third intermediate image.

35. The computer program product of claim 34, wherein the instructions operable to cause a computer system to composite include instructions operable to cause a computer system to apply any standard interior effects and post-border interior effects to the third intermediate image to generate a fourth intermediate image.

36. The computer program product of claim 35, wherein the standard interior effects are selected from inner shadow and inner glow.

37. The computer program product of claim 35, wherein the post-border interior effects are selected from inner bevel.

38. The computer program product of claim 35, wherein the instructions operable to cause a computer system to composite include instructions operable to cause a computer system to apply any underlying effects and exterior effects to the second intermediate image to generate a fifth intermediate image.

39. The computer program product of claim 38, wherein the underlying effects are selected from outer glow and drop shadow.

40. The computer program product of claim 38, wherein the exterior effects are selected from outer bevel.

41. The computer program product of claim 38, wherein the instructions operable to cause a computer system to composite include instructions operable to cause a computer system to cross-fade the fifth intermediate image with the fourth intermediate image to generate a sixth intermediate image.

42. The computer program product of claim 41, wherein the instructions operable to cause a computer system to composite include instructions operable to cause a computer system to apply an over effects to the sixth intermediate image to generate a seventh intermediate image.

43. The computer program product of claim 42, wherein the over effects are selected from emboss.

44. The computer program product of claim 42, wherein the instructions operable to cause a computer system to composite include instructions operable to cause a computer system to cross-fade the underlying image with the seventh intermediate image to generate a resulting image.

45. The computer program product of claim 29, wherein the composition sequence includes at least one conditional branch.

* * * * *

UNITED STATES PATENT AND TRADEMARK OFFICE
CERTIFICATE OF CORRECTION

PATENT NO. : 6,803,923 B1
DATED : October 12, 2004
INVENTOR(S) : Mark Hamburg

It is certified that error appears in the above-identified patent and that said Letters Patent is hereby corrected as shown below:

Column 15,
Line 30, delete "effets" and replace with -- effects --;
Line 40, delete "33" and replace with -- 32 --;
Line 45, delete "sytem" and replace with -- system --;

Column 16,
Line 32, delete "an" and replace with -- any --.

Signed and Sealed this

Eighth Day of February, 2005

JON W. DUDAS
*Director of the United States Patent and Trademark Office*